March 18, 1930.    L. H. BALDWIN    1,750,950

EMERGENCY WHEEL FOR AEROPLANES

Filed April 29, 1929

Lewis H. Baldwin INVENTOR

BY Loyal J. Miller

ATTORNEY

Patented Mar. 18, 1930

1,750,950

UNITED STATES PATENT OFFICE

LEWIS H. BALDWIN, OF OKLAHOMA CITY, OKLAHOMA

EMERGENCY WHEEL FOR AEROPLANES

Application filed April 29, 1929. Serial No. 359,077.

My invention relates to a spare or emergency wheel for aeroplanes.

The principal objects of my invention are to provide a device of this character which is new, novel, practical, and of utility; to provide a wheel so mounted on the side and bottom of the cowl of an aeroplane and controlled from the cockpit that it can be released and swung into position to replace either the right or left landing wheel which may have been destroyed in an attempted landing or a takeoff; to provide a device of this kind which can be instantly brought into position as soon as it is found that the regular landing wheel is broken, which is substantial and durable; which will help to prevent injury to the pilot; which will help to prevent injury to the plane; which will be dependable; which will be efficient for all the purposes for which it is intended.

When one wheel of an aeroplane is wrecked in an attempted landing or a takeoff, by striking a rut or for any other reason, the plane cannot be brought to a stop without a smash-up regardless of how skilled the aviator may be. At present the aviator must trust to luck and take chances of being killed by the certainty of a smash-up, but with my spare or emergency wheel the danger is eliminated.

Figure 1:
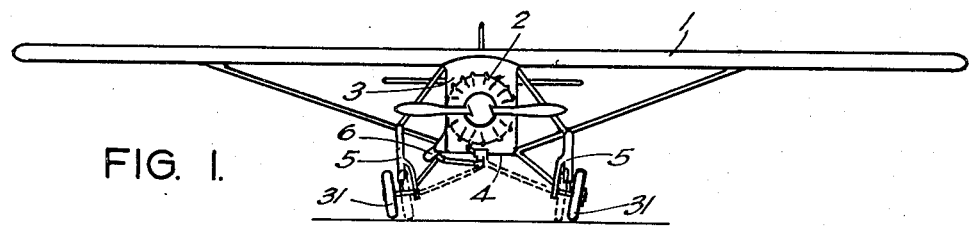
Figure 4:
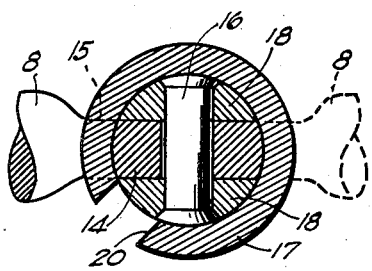
Figure 2:
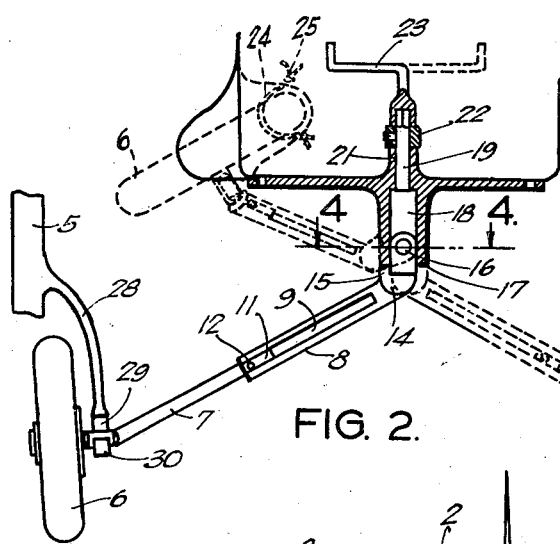
Figure 5:
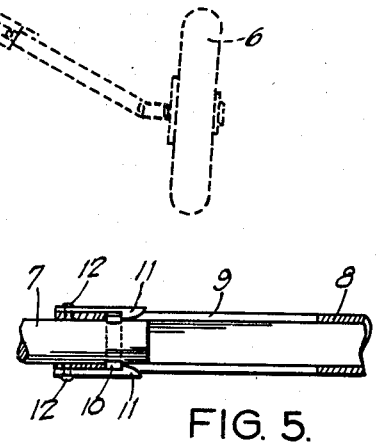
Figure 3:
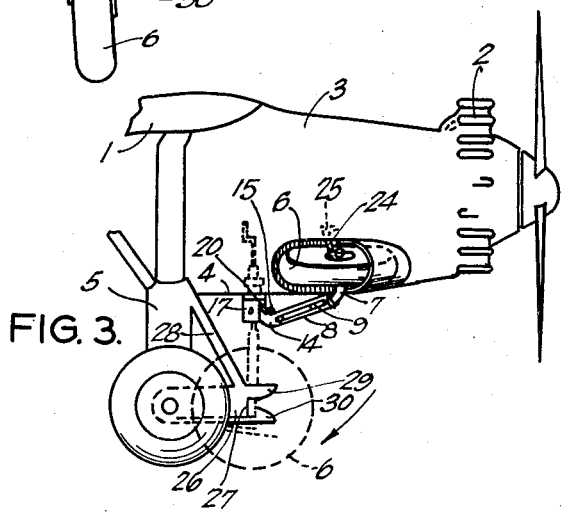

With these and other objects in view as will more fully appear my invention consists in the construction, novel features, and combination of parts hereinafter more fully described, pointed out in the claims hereto appended, and illustrated in the accompanying one-sheet drawing, of which, Figure 1 is a front elevational view of an aeroplane showing my spare wheel secured to the cowl in its carrying position, its emergency positions being indicated by dotted lines; Fig. 2 is a front elevational view, partly in section, showing the mounting for my spare wheel, its alternate position shown in dotted lines; Fig. 3 is a fragmentary side elevation of an aeroplane having my spare wheel secured to the side of the cowl the dotted lines showing its operative position; Fig. 4 is an enlarged sectional view on the line 4—4 of Fig. 2; and Fig. 5 is a fragmentary sectional view of the telescoping axle support.

Like characters of reference designate like parts in all the figures.

It is understood that various changes in the form, proportion, size, shape, weight and other details of construction, within the scope of my invention may be resorted to without departing from the spirit or broad principle of my invention and without sacrificing any of the advantages thereof; and it is also understood that the drawings are to be interpreted as being illustrative and not restrictive.

A practical embodiment of the invention as illustrated in the drawings includes:

My device is shown attached to an aeroplane 1 having landing gear 5 and wheels 31. Said device having wheels 6 is attached behind the plane's engine 2, and detachably secured to side cowl 3 and securely mounted on bottom cowl 4, by means more fully described below.

One end of axle 7 for said wheel 6 is slidably mounted within a hollow supporting arm 8 for the purpose of telescoping said axle 7 when said wheel 6 is to be secured to said cowl 3 behind engine 2. Slots 9 in the sides of arm 8 provide a race for a pin 10 through and adjacent the end of said axle 7 which prevents said axle 7 from turning in hollow arm 8. When said wheel 6 is released from said cowl 3 and swings down upon said arm 8 and said axle 7 as indicated by the arrow in Fig. 3, said pin 10 slides within slots 9 until it reaches the lower end thereof where catches or detents 11 catch the protruding ends of said pin 10 and securely hold said axle 7 in its extended position. The said detents 11 are secured to the lower end of arm 8 by rivets 12 or in any other suitable manner. Mounting 13 is secured to bottom cowl by any suitable means in any convenient position in front of landing gear 5 so as to have crank 23 within the cockpit and within reach of the aviator. The upper end 14 of arm 8 forms a pivot or hinge connection and is provided with a shoulder 15, said end 14 is inserted in a bifurcated portion adjacent the lower end of shaft 18, and secured therewith in by pivot 16. Said pivot end 14 and said shaft 18 are mounted within a housing 17 which extends downward from said mounting 13. When said wheel 6 is anchored to said cowl 3, said pivot end 14 of supporting arm 8 is seated within slot 20 in the forward side of housing 17 and held securely to and prevented from swinging away from said cowl 3 by any suitable means 23 such as rope and the like, which passes through an opening 25 in said cowl 3. A reduced portion 19 of said shaft 18 extends upwardly through housing 21 made integral with said mounting 13. Said portion 19 of shaft 18 is secured within said housing 21 by set collar 22 or by any other usual means. Crank 23 is adapted to attaching the squared portion adjacent the upper end of said shaft portion 19 and provides positive means by which the aviator can swing wheel 6 to either the right or left side of the plane. In some planes it may be found necessary to use other means than a crank for swinging said wheel, and this inventor reserves the right to use any usual or known means for turning said shaft 18 at the pilot's seat, such as gears and the like. Horizontal member 26 provides means for securely holding axle 7 against landing gear 5, said axle 7 being seated against shoulder 27 and braced by member 28. A guide 29 and catch 30 position and hold said axle 7 against said shoulder 27.

When an aviator, in attempting to land his plane, has the misfortune to wreck one of his wheels, he can safely land when his plane is equipped with my spare wheel, for he can rise above the land field and observe which wheel is out of commission. Then on releasing the holding means 24 which secured wheel 6, by turning crank 23 the said wheel can be swung in the desired direction, the weight of said wheel 6 will withdraw the axle 7 from the hollow arm 8 to its full length when it will be held by pin 10 and detents 11. It is to be understood that if desired a compression spring may be used within said arm 8 for forcing said axle to withdraw therefrom. Further movement of the crank will seat axle 7 against shoulder 27 where it will be held by catch 30, shoulder 15 on pivot end 14 will at the same time seat on the bottom of housing 17 and the wheel 6 will be as rigidly secured to the plane as if made a part of the original landing gear.

Obviously, the invention is susceptible of embodiment in forms other than that which is illustrated in the accompanying drawings and described herein, and applicable for uses and purposes other than as detailed, and I therefore consider as my own all such modifications and adaptations and other uses of the form of the device other than as herein described as fairly fall within the scope of my invention.

Having thus described my invention what is claimed and desired to be secured by Letters Patent, is:

1. A device, as described, embodying, a pivoting, telescoping axle operatively attached beneath the cowl of an aeroplane and adapted to be folded against the side of and be suspended from said cowl, means within the cockpit for releasing said axle from said suspension, means within said cockpit for turning said axle to either side of said aeroplane, catch means for attaching the free end of said axle at either end of its throw to the regular running gear, and a wheel operatively mounted upon said axle for emergency use.

2. A device, as described, embodying, an emergency wheel for an aeroplane, adapted to be used adjacent either of the aeroplane wheels, a telescoping axle operatively supporting said wheel, catch means for holding said telescoping axle at the end of its throw, means for movably anchoring said axle to the cowl of said aeroplane, means for suspendedly fastening said wheel while out of operative position to the side of said cowl, means within the cockpit of said aeroplane for releasing said wheel, crank means within said cockpit for operating said device, catch means for rigidly and operatively positioning said wheel adjacent either of the regular wheels of said aeroplane, and means for bracing the free end of said axle against the regular landing gear of said aeroplane.

3. A device, as described, embodying, an emergency wheel for an aeroplane, adapted to be used adjacent either of the aeroplane wheels, a telescoping axle operatively supporting said wheel, catch means for holding said telescoping axle at the end of its throw, spring means within said telescoping axle for forcing said axle to the end of its throw, means for movably anchoring said axle to the cowl of said aeroplane, means for suspendedly fastening said wheel while out of operative position to the side of said cowl means within the cockpit of said aeroplane for releasing said wheel, gear and crank means within said cockpit for operating said device from adjacent the aviator's seat, catch means for rigidly and operatively positioning said wheel adjacent either of the regular wheels of said aeroplane, and means for bracing the free end of said axle against the regular landing gear of said aeroplane.

4. A device, as described, embodying, an emergency wheel for use adjacent either regular wheel of an aeroplane, a telescoping axle therefor, a plate for anchoring said axle upon the bottom of the cowl of said aeroplane, a shaft extending through said plate into the cockpit of said aeroplane, a housing formed integral with said plate for operatively housing said shaft, hinge means for attaching the upper end of said axle to the lower end of said shaft for allowing said axle to be folded and fastened against the side of said cowl, means upon the upper end of said shaft for turning said shaft and swinging said axle and said emergency wheel to either side of said aeroplane into operative position, and means for rigidly positioning the free end of said axle and said emergency wheel adjacent either of said regular wheels.

5. A device, as described, in combination an emergency wheel for use adjacent either regular wheel of an aeroplane, a telescoping axle therefor, a plate for anchoring said axle upon the bottom of the cowl of said aeroplane, a shaft extending through said plate into the cockpit of said aeroplane, a housing formed integral with said plate for operatively housing said shaft, hinge means for attaching the upper end of said axle to the lower end of said shaft for allowing said axle to be folded and fastened against the side of said cowl, means upon the upper end of said shaft for turning said shaft and swinging said axle and said emergency wheel to either side of said aeroplane into operative position, and means for rigidly positioning the free end of said axle and said emergency wheel adjacent either of said regular wheels, as and for the purposes specified.

LEWIS H. BALDWIN.